United States Patent
Albright

[15] 3,654,912
[45] Apr. 11, 1972

[54] FOOD-BROILING APPARATUS

[72] Inventor: Charles Jere Albright, 313 West North Avenue, Chicago, Ill. 60631

[22] Filed: May 21, 1969

[21] Appl. No.: 826,503

Related U.S. Application Data

[63] Continuation-in-part of Ser. No. 682,033, Nov. 13, 1967, abandoned.

[52] U.S. Cl. ...................................................126/41 R
[51] Int. Cl. ............................................A47j 37/06, F24c 3/04
[58] Field of Search ..............................126/41, 19, 21, 273; 99/389–400; 219/388; 431/328

[56] References Cited

UNITED STATES PATENTS

| | | | |
|---|---|---|---|
| 2,949,524 | 8/1960 | Scarioni | 99/392 X |
| 3,193,663 | 7/1965 | Budzich et al. | 99/391 X |
| 3,251,396 | 5/1966 | Nitsche | 431/328 |
| 3,267,924 | 8/1966 | Payne | 126/41 |
| 3,334,620 | 8/1967 | De Werth | 126/41 |
| 3,339,477 | 9/1967 | Wilson | 99/400 X |
| 3,372,635 | 3/1968 | Meyer | 126/41 X |

Primary Examiner—Charles J. Myhre
Attorney—Shoemaker and Mattare

[57] ABSTRACT

The essential concept of this invention involves a cabinet defining a cooking chamber and wherein are mounted a plurality of incandescent-type heating elements vertically and horizontally disposed with respect to the central area of the cooking chamber, the cabinet having horizontally-disposed therein at least one elongated opening medially of the heating elements for the insertion and positioning of food-supporting facility, to expose the food to cooking on all areas by the simultaneous action of the heating elements, subject to a withdrawal of the facility with cooked food thereon.

9 Claims, 8 Drawing Figures

PATENTED APR 11 1972 3,654,912
SHEET 1 OF 2
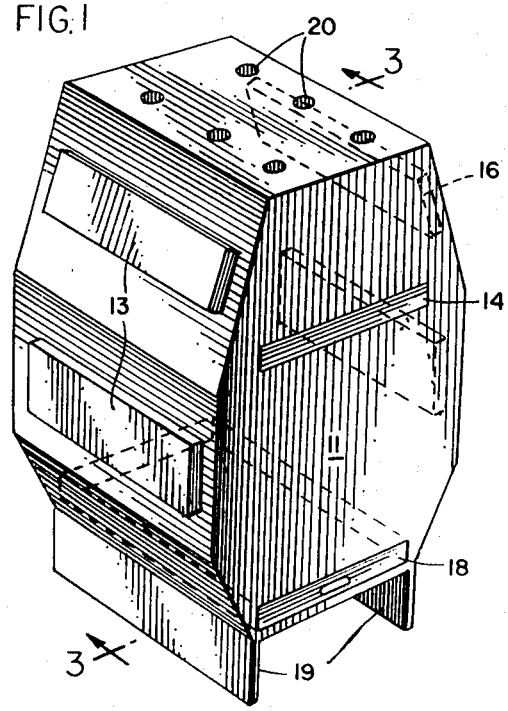
FIG. 1
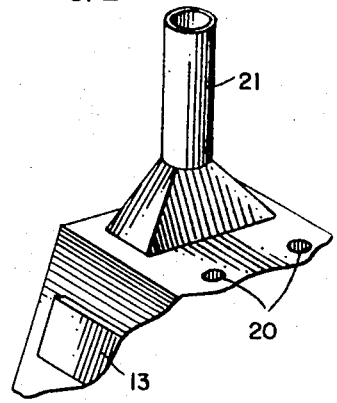
FIG. 2
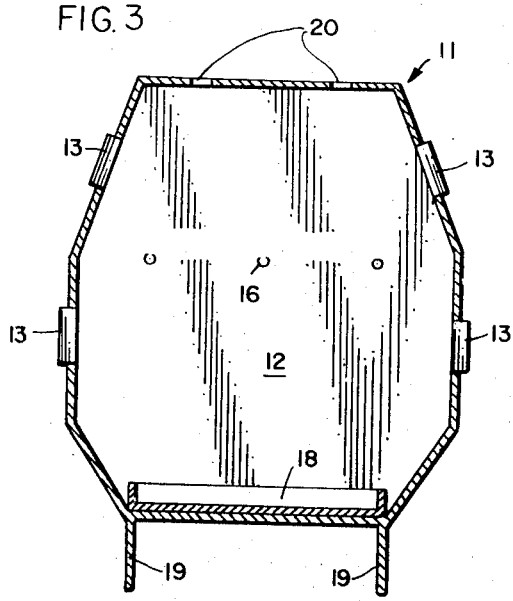
FIG. 3
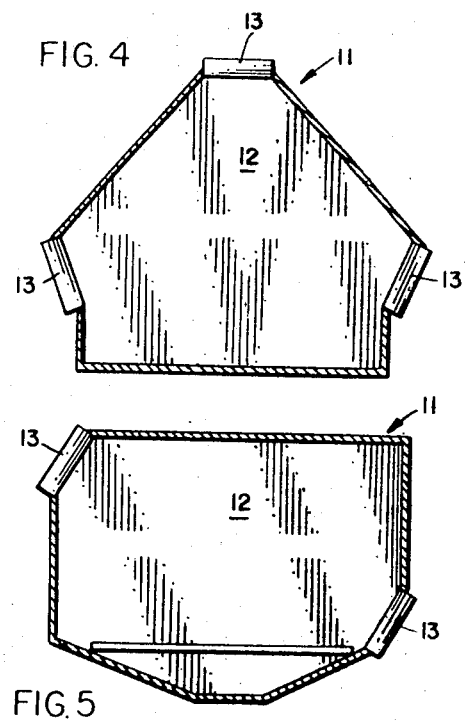
FIG. 4
FIG. 5
INVENTOR:
CHARLES JERE ALBRIGHT
BY
Edwin Phelps
ATT'Y

INVENTOR:
CHARLES JERE ALBRIGHT
BY
ATT'Y

FOOD-BROILING APPARATUS

This application is a continuation in part of application Ser. No. 682,033, filed Nov. 13, 1966, now abandoned.

Varied are the types of food-broiling apparatus that have been developed over the years. The earlier produced types had heat provided by incandescent wire coils electrically-activated. More recently such commercial apparatus has incorporated a gas-fed-type of heating element. However, the cabinets and the controlling equipment of these antecedent developments have been distinctively different in form and function from the instant development. Some of the such prior structures are shown in U.S. Pat. Nos. 1,713,303; 1,712,171; 2,945,767; 2,997,941; 3.031,948; 3,087,418; 3,267,924.

Several of these antecedent apparatus have top openings. They require relatively complicated mechanisms for the shifting of the food-supporting units vertically into and out of food-cooking position and concurrently shifting cover-plates into and out of position to close the upwardly-open cooking chamber to avoid the hazard of fire. Other of these earlier patents disclose apparatus with vertical and slanted-side openings. However, here also, rather intricate mechanism was required for such side-wise shifting of the food-supporting units and moving the heat elements into and out of operative position.

The main objects of this invention are; to provide an entirely new type of apparatus for the processing of food by broiling; to provide an apparatus of this kind involving a cabinet having a plurality of upper and lower opposed heating elements; to provide an improved apparatus of this kind having a horizontally-disposed elongated opening intermediate the heat elements for the horizontal insertion and withdrawal of the food-supporting facility; to provide an apparatus of this kind especially adapted for the cooking of meat products; to provide an apparatus of this kind wherein the heating elements are gas fired to expose the food to cooking by direct infra-red heat; to provide a broiling apparatus of this kind which, by virtue of its structure, entirely eliminates the problem of fire hazard; to provide a broiling apparatus of this kind which precludes the re-entry of unburned gases to the heating elements; and to provide an apparatus of this kind of such simple and practical structure as to make its manufacturing and marketing very economical and its use by purchasers thereof most facile and highly gratifying.

In the adaptation shown in the accompanying drawing:

FIG. 1 is an exterior perspective view of a preferred structure of a food-cooking apparatus of this kind;

FIG. 2 is a top-perspective of a portion of the cabinet; shown in FIG. 1, whereon is arranged a stack for directing the unburned gases away from their subsequent mixing with the fuel flow to the heating elements;

FIG. 3 is a transverse sectional view of the cabinet taken on the plane of the line 3—3 of FIG. 1;

FIG. 4 is a diagrammatic view showing a modified arrangement of the heating elements;

FIG. 5 is another diagrammatic view of a modified arrangement of the heating elements;

Figure 7:
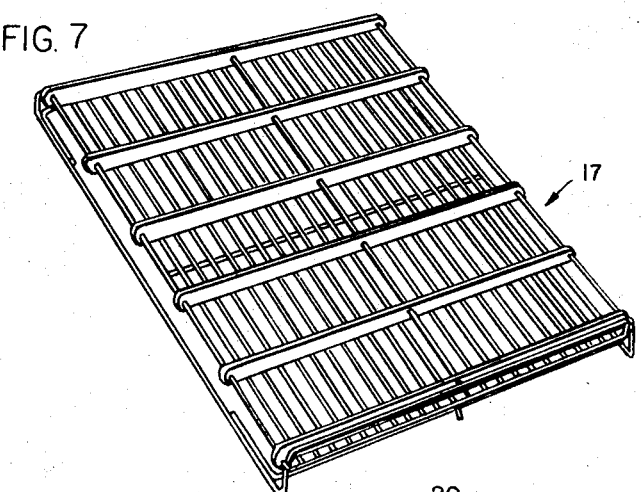
Figure 8:
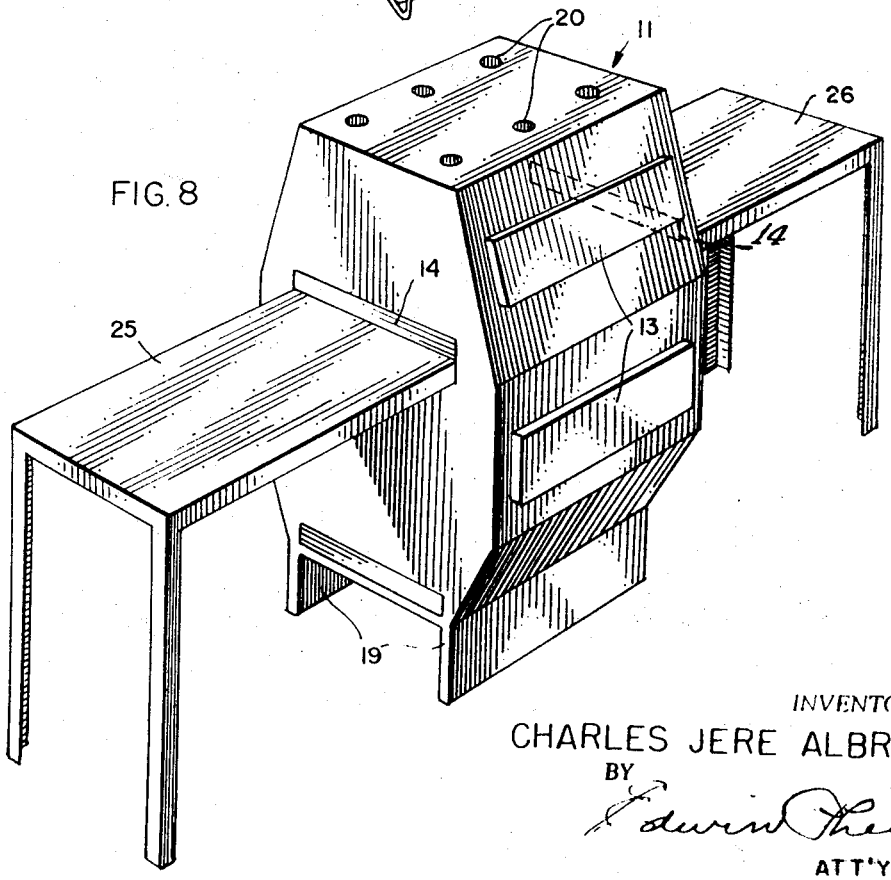

FIG. 7 is a perspective view of one type of food-supporting facility especially structured for use in such an apparatus as herein shown; and FIG. 8 is a diagrammatic perspective of an apparatus of this kind having oppositely-extending platforms to permit an acceptable positioning thereon of successive cooking facilities for insertion thereof into the narrow opening at one side of the cooking apparatus and the removal of the cooking facility from the other side of the cooking apparatus, to speed up production.

A food-cooking apparatus embodying the foregoing concept comprises a cabinet 11 defining a cooking chamber 12 wherein is arranged a plurality of heating elements 13 and having a horizontally disposed narrow opening 14 juxtaposed to a support 16 for positioning a food-supporting facility 17 in food-cooking relationship to the heating elements 13. Preferably, such a support 16 comprises spaced parts as is apparent from FIGS. 3, 4 and 5. Below the support 16 is arranged a removable grease-collecting drawer 18.

The cabinet 11, except for the horizontal opening and the later-noted vents, is an entirely closed structure. It is structured from pre-fabricated sections of material bonded together in the conventional manner for equipment of this kind. Supporting legs 19 are shown to dispose the cabinet a short distance above the floor and locate the opening 14 at the most convenient level for the facile insertion and removal of the food facility 17. The top panel of the cabinet here is shown with either ports 20 or a stack 21 for the escape of unburned gases, likely to result from the continuous use of this apparatus over long periods of time for a reason that will be explained presently.

Figure 6:
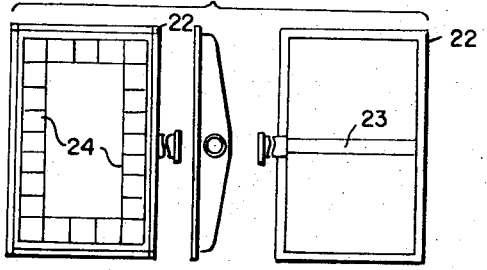
FIG. 6 is a three-part view of a conventional type of heating element used in this development.

There are several forms of heating elements suitable for use with this apparatus. One such is electrical. The form here shown in FIG. 6 is one of the commercially available heating elements 13 which has been found to be most practical. Such units involve a housing 22 having a fitting 23 for connection to a source of gas supply. The rectangles 24 on the face of the housing 22 represent ceramic plates. Each of these has a myriad of very small, closely arranged apertures. The burning gas jets issuing through these apertures convert the ceramic plates into an incandescent condition. A plurality of such infra-red heating elements are shown in several different arrangements within the cabinet where the cooking facility 17 is positioned on the support 16. These units ensure the effective cooking of the entire area (top, bottom and perimeters) of each unit of food resting on the facility 17 when that facility is positioned on the support 16 within the cooking chamber 12.

The gas-oxygen mixture for these heating elements 13 is supplied through a conventional venturi unit connected to a pressured gas supply. The oxygen, for mixing with the gas, is obtained from the ambient air drawn into the fitting 23.

The ports 20 or the stack 21, in the top of the cabinet, serve to direct, outwardly upward from the cooking chamber 12, the unconsumed gases—nitrogen from the ignited gas air mixture. Also, any moisture vapors oozing from the cooking food may escape through the ports 20 or the stack 21. Such escape of these unconsumed gases or vapors has to be effected so as to avoid any possibility of their becoming recirculated to and mixed with the air supply to these heating elements 13. Were this latter condition to occur it would tend to lessen the requisite efficacy of these heating elements 13, especially during long periods of uninterrupted use of this apparatus.

When meat patties are the products cooked in the chamber 12 the inevitable oozing juices (grease) drop into the drawer 18. From time to time this is removed, emptied, cleansed and replaced for use.

This thusly structured apparatus was conceived and developed for use in the broiling of quantities of meat patties such as hamburgers. Very particularly this apparatus was structured for use with a special type of patty-supporting facility such as indicated in FIG. 7. The details of the form and use of this facility are shown, described and claimed in copending application Ser. No. 700,608, filed Jan. 25, 1968. Such food broiling apparatus, as herein shown and described, makes possible a most practical use in the conventional, wayside operations where, at times, an expeditious mass-production of such food products is imperative, to keep up with the fast-moving demands. Thus, in such circumstances, the facilities 17, such as described in the above-noted copending application, may have the meat patties laid out on a plurality of such facilities 17 and stacked in caster-mounted carts. These may be kept in a refrigerating chamber until the products are required for cooking. At such time the carts may be rolled out adjacent to the apparatus, as is herein described. One after another of the stacked facilities 17 may be successively inserted through the side opening 14 for a very quick cooling of the products thereon. Thereupon, each facility can be withdrawn through the opening 14 to permit another facility 17 to be inserted through the opening. The withdrawn facility then may have the cooked products removed almost instantly as explained and illustrated in the aforesaid copending application Ser. No. 700,608.

In this connection it may be noted that such an apparatus may be supplemented with a platform section 25 and 26 oppositely arranged as shown in FIG. 8. In situations where mass production is required over extended periods a succession of facilities 17 could be wheeled alongside the platform 25. One operator, in properly-timed succession, could place the loaded facilities 17 onto the platform 25 and successively shift them through the front opening 14 to rest on the support 16. Thus a subsequently inserted facility could cause a preceding facility to be pushed out through a second opening 14 onto the opposite platform 26. (See FIG. 8) Each such facility 17 of cooked food units then could be positioned, by another operator, on a tray over an aligned group of half-buns, as indicated in co-pending application Ser. No. 700,608. Thereupon, still another operator could complete the desired sandwiches for handing to waiting patrons.

In some circumstances these platforms 25 and 26 could have associated therewith a conveyor controlled by an automatic timer means, for successively advancing each loaded facility 17 into the cooking chamber 12 and subsequently exiting it through an opposite opening. Such an arrangement is part of the subject matter of the above-noted copending application.

Variations and modifications in the details of structure and arrangement of the parts may be resorted to within the spirit and coverage of the appended claims.

I claim:

1. A food-cooking apparatus comprising, a cabinet with permanently fixed, vertically disposed side-walls and a top wall defining therewithin a substantially enclosed food-cooking chamber with an entrance through a horizontally positioned narrow-opening in one side wall of the cabinet, a support in the form of horizontally spaced means spanning the interior of the cabinet adjacent the opening for positioning thereon a food-supporting facility, a plurality of radiant heat producing elements fixed in the chamber above and below the opening and oppositely outward of the food on the food-supporting facility for direct exposure of the upper and lower and perimetrical portions of the food-products on the facility to concurrent cooking by direct action of the heat from the heating element, venting means remote from the opening to vent the interior of the cooking chamber.

2. A food-cooking apparatus as set forth in claim 1 wherein the heating elements are of an incandescent type.

3. A food-cooking apparatus as set forth in claim 1 wherein four heating elements are arranged in pairs at opposite sides of the cabinet with one element of each pair being above the plane of the cabinet opening and the other element of each pair being below the cabinet opening.

4. A food-cooking apparatus as set forth in claim 1 wherein the heating elements are gas-air-fed ceramic structures which provide infra-red heat when in use, and the cabinet has means for controlling the escape of unburned gaseous ingredients, from within the cooking chamber, remotely from the air-inlets of the heating elements.

5. A food-cooking apparatus as set forth in claim 4 wherein four heating elements are arranged in pairs at opposite sides of the cabinet with one element of each pair being above the cabinet opening and the other element of each pair being below the cabinet opening.

6. A food-cooking apparatus as set forth in claim 1 wherein there are three heating elements, two positioned below the cabinet opening with the heating areas oppositely disposed and the third element is located in the top of the cabinet in axial disposition with respect to the food-supporting facility when inserted to rest on the positioning support.

7. A food-cooking apparatus as set forth in claim 1 wherein there are two heating elements in diagonal disposition at opposite sides and above and below the cabinet opening.

8. A food-cooking apparatus as set forth in claim 1 wherein the cabinet has aligned, horizontally disposed openings in opposite sides of the cabinet to permit food-supporting facilities to be successively inserted through one opening to rest on the positioning support for the cooking of the foods and subsequently to permit withdrawal of the facilities through the opposite opening.

9. A food-cooking apparatus as set forth in claim 8 wherein horizontally-disposed platforms are arranged in oppositely outward disposition from the respective cabinet opposite openings to permit the successive positioning thereon of food-supporting facilities subject to insertion into and removal from the cabinet, respectively.

* * * * *